United States Patent
Meyn

Patent Number: 5,370,574
Date of Patent: Dec. 6, 1994

[54] METHOD AND APPARATUS FOR SUSPENDING POULTRY WITH ITS LEGS FROM A SUSPENSION CONVEYOR

[75] Inventor: Cornelis Meyn, Oostzaan, Netherlands

[73] Assignee: Machinefabriek Meyn B.V., Oostzaan, Netherlands

[21] Appl. No.: 948,092

[22] Filed: Sep. 21, 1992

[30] Foreign Application Priority Data

Sep. 20, 1991 [NL] Netherlands ............ 9101585

[51] Int. Cl.$^5$ ............ A22C 21/00; A22C 15/00
[52] U.S. Cl. ............ 452/179; 452/178; 452/183; 452/53
[58] Field of Search ............ 452/179, 180, 182, 177, 452/178, 181, 183, 53

[56] References Cited

U.S. PATENT DOCUMENTS

| | | | |
|---|---|---|---|
| 4,215,654 | 8/1980 | Parker, Jr. | 452/178 |
| 4,272,863 | 6/1981 | Parker, Jr. | |
| 4,307,683 | 12/1981 | Parker, Jr. | |
| 4,658,476 | 4/1987 | van den Brink | 452/53 |
| 5,088,959 | 2/1992 | Heemskerk | 452/183 |
| 5,129,857 | 7/1992 | Keiter et al. | 452/179 |

FOREIGN PATENT DOCUMENTS 0145077  6/1985  European Pat. Off.

Primary Examiner—Willis Little
Attorney, Agent, or Firm—Dority & Manning

[57] ABSTRACT

In the invention poultry to be suspended with its legs from a suspension conveyor is first oriented in parallel with a certain direction, such as the conveying direction of the suspension conveyor, next spaced at a certain mutual distance, thereafter oriented in the same direction with its belly and finally, in this position, engaged by its legs and lifted by the suspension conveyor. The apparatus according to the invention comprises a conveyor supporting and supplying the poultry, means for orienting the poultry in parallel with the conveying direction of the conveyor and means for orienting the poultry with its belly in the conveying direction.

12 Claims, 1 Drawing Sheet

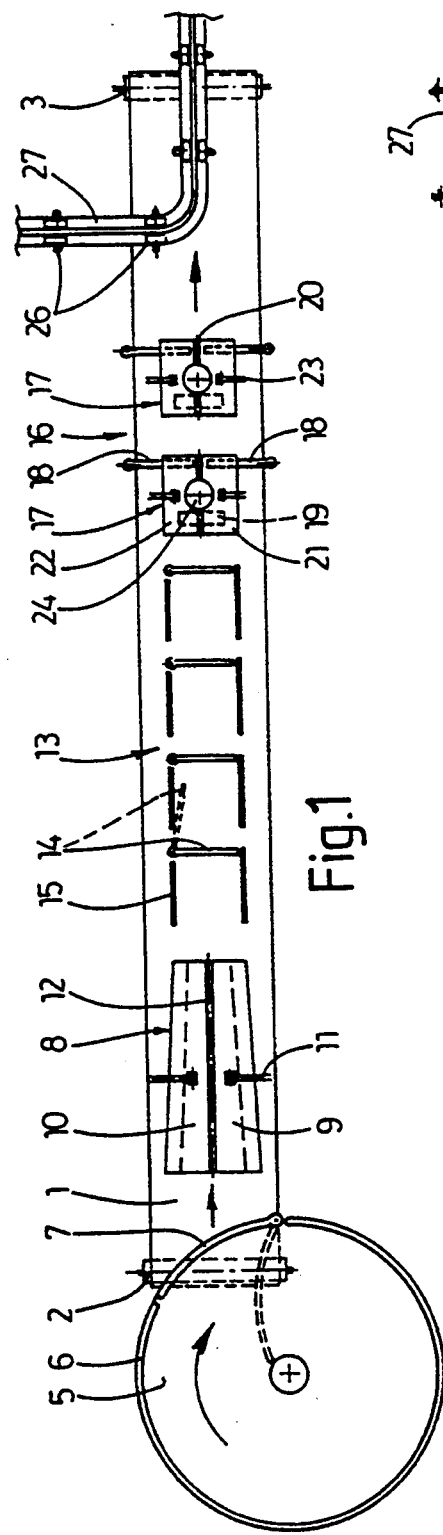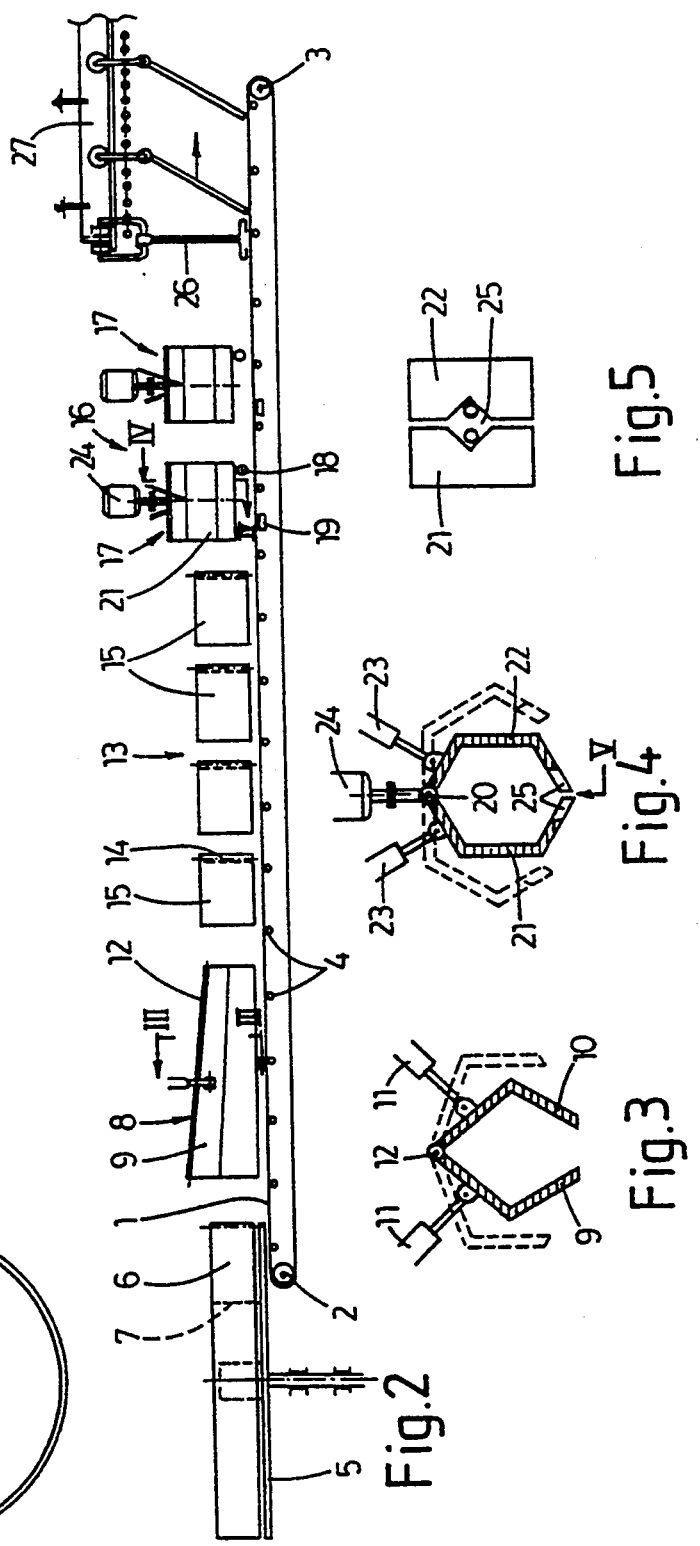

METHOD AND APPARATUS FOR SUSPENDING POULTRY WITH ITS LEGS FROM A SUSPENSION CONVEYOR

BACKGROUND OF THE INVENTION

The invention relates to a method for suspending poultry with its legs from a suspension conveyor. Further, the invention relates to an apparatus for carrying out this method.

In a large number of processing methods for poultry it is common practice for the poultry to be suspended by its legs from the hooks of a suspension conveyor. In such a suspended position tthe poultry is then supplied to several processing machines. Suspending poultry from the hooks from a suspension conveyor nowadays occurs mainly manually. This is a result of the fact that at the moment of suspending the poultry from the suspension conveyor it is still alive and thus is offered to the suspension location in different, non-predictable positions.

It will be realized that manually suspending poultry with its legs from a suspension conveyor is labor-intensive. Further, it is dull and stultifying labor. Moreover, with the present processing velocities of processing machines for poultry the limitations of human capacities are reached, such that more than one operator is required for suspending the poultry from the suspension conveyor, this still further increasing the costs.

In the past, several attempts have been made for automating the suspension of poultry from a suspension conveyor. However, in practice the proposed measures appear to be not or hardly realizable or are so complicated that the application is not attractive.

SUMMARY OF THE INVENTION

It is an object of the invention to optimize the method for suspending poultry with its legs from a suspension conveyor in such a way that a basis is provided for its automation.

Thus, the method according to the invention is characterized by the next steps:
(a) orienting the poultry in parallel with a certain direction, such as the conveying direction of the suspension conveyor;
(b) spacing the poultry at a certain mutual distance;
(c) orienting the poultry with its belly in the said direction; and
(d) engaging the legs of the poultry so oriented by means of the suspension conveyor and lifting the poultry.

As noted, the supply of poultry occurs in an uncontrolled way as relating to its position. Thus, the first step of the method is orienting the poultry in parallel with a certain direction, such as the conveying direction of the suspension conveyor. After this step the poultry is oriented in this direction with its belly or its back. This means that each separate bird is positioned in one of two clearly defined positions.

Next, the poultry, if necessary, is spaced at a certain mutual distance. As a result it is possible to optimally conduct the next step. This next step comprises orienting the poultry with its belly in the certain direction, which only occurs for those birds of which initially the back was oriented in the certain direction after being oriented in parallel with the certain direction.

When all birds are oriented in the same direction (that is with the belly in the same direction), the legs of the poultry are engaged by the suspension conveyor and the poultry is lifted.

Using the method according to the invention, supplied birds, irrespective the position in which they are supplied, are identically offered to, and suspended from, the suspension conveyor. Thus, this method is a basis for an automation of this process.

The apparatus for carrying out the method according to the invention is characterized by a conveyor supporting and supplying the poultry, means for orienting the poultry in parallel with the conveying direction of the conveyor and means for orienting the poultry with its belly in the conveying direction.

In this respect the apparatus further comprises means for, after orienting the conveying direction, spacing the poultry at a certain mutual distance.

Using the apparatus according to the invention the method according to the invention can occur in a completely automated way, so that the previously mentioned manual realization of the method and its copending disadvantages will not occur.

According to a preferred embodiment of the apparatus according to the invention the orienting means comprise two sheets defining a tunnel narrowing in the conveying direction, the sheets further being movable to and from transversely to the conveying direction. When the sheets move towards each other transversely to the conveying direction they engage the poultry and make sure that it is oriented in the conveying direction with its back or its belly. Initially the engagement with the poultry occurs moderately at the widest section of the tunnel, and it increases while the poultry is moved by the conveyor in the direction of the narrower section of the tunnel. Further, these orienting means have the effect that all birds are located at the same lateral position of the conveyor, which simplifies later processing steps.

Further, the means for orienting poultry with its belly in the conveying direction comprise means registrating the position of the poultry and means for rotating, over 180°, the poultry initially oriented in the conveying direction with its back When the registration means determine that a bird is oriented in the conveying direction with its back the rotating means are activated, such that the respective bird is rotated over 180° until it is oriented in the conveying direction with its belly.

Constructively, the registration means comprise a stopper for temporarily engaging the poultry at the height of the knee joint and a weight-sensitive means positioned below the conveyor and behind the stopper position as seen in the conveying direction. The knee joint of a bird oriented in the conveying direction with its back forward is oriented in the conveying direction too. At the moment where the knee joint engages a stopper the legs of the bird are positioned at the weight-sensitive means which reacts to the weight of the bird. This leads to the activation of the rotating means.

If, however, the bird is already oriented in the conveying direction on its belly the forward side of the knee joint (in fact the back of the knee) will engage the stopper. At this very moment the legs of the respective bird have already passed the weight-sensitive means, which then will not be activated. This also means that no activation of the rotating means will occur.

In a special embodiment of the invention the rotation means comprise two cooperating plates which pivot around a horizontal axis and which, in a first position, give free the poultry and a second position sideways enclose the poultry while letting free a lower passage for the legs of the poultry, said plates being commonly suspended from and rotatable around a vertical axis.

BRIEF DESCRIPTION OF THE DRAWINGS

Hereinafter the invention will be elucidated by means of the drawing, in which an embodiment of the invention is illustrated, in which:

FIG. 1 is a schematic top plan view for an embodiment of the invention;

FIG. 2 is a side elevational view of the apparatus of FIG. 1;

FIG. 3 is a sectional view, taken on line III—III of FIG. 2, on a larger scale;

FIG. 4 is a sectional view, taken on line IV—IV of FIG. 2 on a larger scale; and FIG. 5 is a bottom view looking in the direction of arrow V in FIG. 4.

DETAILED DESCRIPTION OF THE INVENTION

The apparatus for suspending poultry with its legs from a suspension conveyor comprises a conveyor 1, which, in the present case, is an endless conveyor belt extending around rolls 2, 3 and being supported by auxiliary rolls 4 (FIG. 2). At the beginning of the conveyor 1 a turn table 5 is located with a surrounding wall 6 and controllable access of port or gate 7. The poultry is positioned onto the turn table 5 and can reach the conveyor 1 when the access port is in its dotted line position.

The birds conveyed by the conveyor 1 in the direction indicated by arrow first reach a station 8 for orienting the poultry in parallel to the conveying direction of the conveyor. In the illustrated embodiment this station comprises two sheets 9, 10 defining a tunnel narrowing in the conveying direction, the sheets being movable to and from transversely to the conveying direction. For this reason, the sheets 9, 10 are connected to cylinder-piston assemblies 11 (clearly visible in FIG. 3). The sheets 9, 10 pivot around a pivot axis 12. As a result of the to and from movement of the sheets 9, 10 around the pivot axis 12 and the narrowing shape of the tunnel defined by the sheets 9, 10 in the conveying direction of the conveyor 1 the poultry is slowly but definitely oriented in parallel to the conveying direction of the conveyor. This means that each bird, after leaving the sheets 9, 10 is oriented in the conveying direction on its belly or its back.

Next, the birds reach a buffer device 13. This comprises a number of cages 15 located at mutual distances and with operatable gates 14. In each cage 15 a bird is supplied by the conveyor 1 from the open backside wherein the bird can only leave the cage 15 if the gate 14 is opened. By an appropriate control of the gates 14 the birds can be spaced at desired mutual distances, while care can be taken that the separate birds are supplied to the next station 16, one by one, in a controlled way.

At the station 16 the birds, which at this moment are oriented in the conveying direction of the conveyor 1 with their backs, are rotated over 180°, such that they are oriented in the conveying direction with their bellies. In the illustrated embodiment station 16 comprises two identical units 17. Basically, also one unit 17 could take care of rotating the birds, but the double provision has as an advantage that the chance of wrongfully not rotating a bird is minimized.

Each unit 17 comprises registration means which registrate whether a bird is oriented in the conveying direction with its back or with its belly. These registration means firstly comprise a stopper temporarily engaging the poultry at the knee joint, the stopper in the illustrated embodiment consists of two rods 18 which, for enabling the poultry to pass, may pivot in the conveying direction. Further, the registration means comprise a weight-sensitive means 19 positioned below the conveyor 1 and behind the stopper position as seen in the conveying direction. A bird oriented in the conveying direction on its back has its knees facing in the conveying direction, such that when these knees engage the rods 18 the legs of the bird are positioned above the weight-sensitive means 19. Then the weight-sensitive means 19 generates a signal for activating the unit 17 for rotating the bird. If a bird is oriented in the conveying direction on its belly the legs of the bird will, when the back of the knees engages the rods 18, already have passed the weight-sensitive means 19, so that no activation of the unit 17 occurs. The unit 17 (also represented in FIG. 4) consists of two cooperating plates 21 and 22 which can pivot around a horizontal axis 20. The pivoting of the plates 21, 22 may occur by cylinder-piston assemblies 23. The entire assembly of plates 21, 22 and cylinder-piston assemblies 23 may be rotated around a vertical axis by a motor 24.

In a first position, which has been represented in FIG. 4 by dotted lines, the plates 21, 22 leaves the bird free. In a second position, represented in FIG. 4 by full lines, the plates 21, 22 sideways enclose the bird while, also leaving free a lower passage 25 for the legs of the poultry (clearly visible in FIG. 5).

When using the registration means 18 and 19 it has been determined that a bird is oriented in the conveying direction of the conveyor 1 on its back and has to be rotated, the plates 21, 22 initially positioned in the first, opened position are moved towards the closed position by the cylinder-piston assemblies 23, thus enclosing the bird. Next the motor 24 is activated and the plates 21, 22 are rotated over 180° around a vertical axis. Next the plates 21, 22 are again separated and the bird is freed.

It is possible, that the rods 18 are lifted over a short distance previously to closing the plates 21, 22, such that the plates 21, 22 correctly engage the breast of the bird.

Next the bird, which is now in the desired position on the conveyor 1, will be engaged at its legs in a way known per se by a hook 26 of a suspension conveyor 27 and will, after leaving the conveyor 1, be suspended with its legs from this hook upside down.

The entire apparatus is completely automated. The control of the stations and other devices may be carried out by a computer system. The buffer device 13 takes care of having prepared birds at each moment to be offered to the rotation unit 16. Depending upon the number of birds present in the buffer device 13 the access gate 7 is opened or closed.

The invention is not limited to the embodiment described above, but may be varied widely within the scope of the invention.

It will be apparent to those skilled in the art that various modifications and variations can be made in the apparatus and method of the present invention without departing from the scope or spirit of the invention. Thus, it is intended that the present invention cover the modifications and variations of this invention provided they come within the scope of the appended claims and their equivalents.

I claim:

1. An automated method for positioning poultry to be suspended by its legs from a suspension conveyor, comprising the following steps:
   orienting the poultry with automatic mechanical means on a conveyor path parallel to the conveying direction of the suspension conveyor;
   spacing the poultry at with mechanical means at predetermined desired positions along the conveyor path;
   determining the orientation of the poultry on the conveyor path with automatic sensing means;
   if determined to be otherwise in said determining step, orienting the poultry on the conveyor path with automatic means so that the belly of the poultry is facing forward in the direction of conveyance; and
   conveying the poultry with its belly in the forward direction to the suspension conveyor.

2. Apparatus for preparing poultry to be suspended by its legs from a suspension conveyor, said apparatus comprising:
   a supply conveyor for supporting and supplying poultry to said suspension conveyor;
   means for orienting said poultry generally parallel to the conveying direction of said suspension conveyor;
   means for determining the orientation of the belly of said poultry relative to said supply conveyor; and
   means for automatically positioning said poultry responsive to said determining means so that said poultry is oriented on said supply conveyor with its belly in the forward direction.

3. Apparatus as in claim 2, further comprising automatic means for spacing each of said poultry at predetermined distances from each other along said supply conveyor.

4. Apparatus as in claim 3, wherein said automatic spacing means comprises a plurality of swingable gates disposed along said supply conveyor in the conveying direction, each of said gates being selectively activated at a predetermined position along said supply conveyor.

5. Apparatus as in claim 2, wherein said orienting means comprises a tunnel section narrowing in diameter in the direction of conveyance of said supply conveyor.

6. Apparatus as in claim 5, wherein said tunnel section comprises oppositely facing sheet members pivotal about a common axis, and mechanical actuating means for moving said sheet members relative each other generally transversely to the direction of said supply conveyor.

7. Apparatus as in claim 2, wherein said supply conveyor is an endless belt conveyor.

8. Apparatus as in claim 2, wherein said determining means comprises stopping means for engaging said poultry at the knee joint thereof, and weight sensitive means disposed behind and below said stopping means in the direction of conveyance, said weight sensitive means determining the orientation of said poultry from the relative weight of said poultry stopped thereabove.

9. Apparatus as in claim 8, wherein said stopping means comprises oppositely disposed rod members pivotal in the direction of conveyance, said rods disposed above said supply conveyor at a height so as to contact the knee joint of said poultry.

10. Apparatus as in claim 2, wherein said automatic positioning means comprises a rotating device responsive to said determining means, said rotating device comprising means for grasping said poultry and rotating said poultry substantially 180 degrees.

11. Apparatus as in claim 10, wherein said grasping and rotating means comprises two cooperating plates, each of which is supported to pivot about a horizontal axis and rotate about a common vertical axis, said plates having a first position which permits free passage of said poultry therethrough, and a second position substantially enclosing and rotating said poultry.

12. Apparatus for orienting and suspending poultry by its legs from a suspension conveyor, comprising:
   a continuous conveyor belt disposed upstream from said suspension conveyor in the direction of conveyance;
   a rotating table operatively disposed so as to deposit poultry upon said conveyor belt;
   a narrowing tunnel section disposed after said rotating table in the direction of conveyance, said tunnel section for orienting said poultry parallel to said direction of conveyance;
   spaced apart cage devices disposed after said narrowing tunnel in the direction of conveyance, said cage members for spacing said poultry at predetermined distances and having automatically actuable ports for allowing said poultry to pass therethrough;
   poultry orientation determining means disposed after said cage devices in the direction of conveyance; said determining means comprising pivotal stop members for engaging said poultry at the knee joint thereof, and a weight sensitive device disposed behind and below said stop members in the direction of conveyance, said weight sensitive device determining the orientation of said poultry from the relative weight of said poultry stopped thereabove;
   an automatically rotatable poultry positioning device, said positioning device being actuable responsive to said determining means and comprising movable grasping plates for grasping said poultry, and means for rotating said grasping plates relative said conveyor belt through a predetermined arc so that said poultry is positioned with its belly facing forward in the direction of conveyance; and
   means for engaging the legs of said poultry by a hook of a suspension conveyor.

* * * * *